May 1, 1923.
J. R. ALEXANDER
VEHICLE SIGNAL
Filed Oct. 3, 1921
1,453,428
2 Sheets-Sheet 2
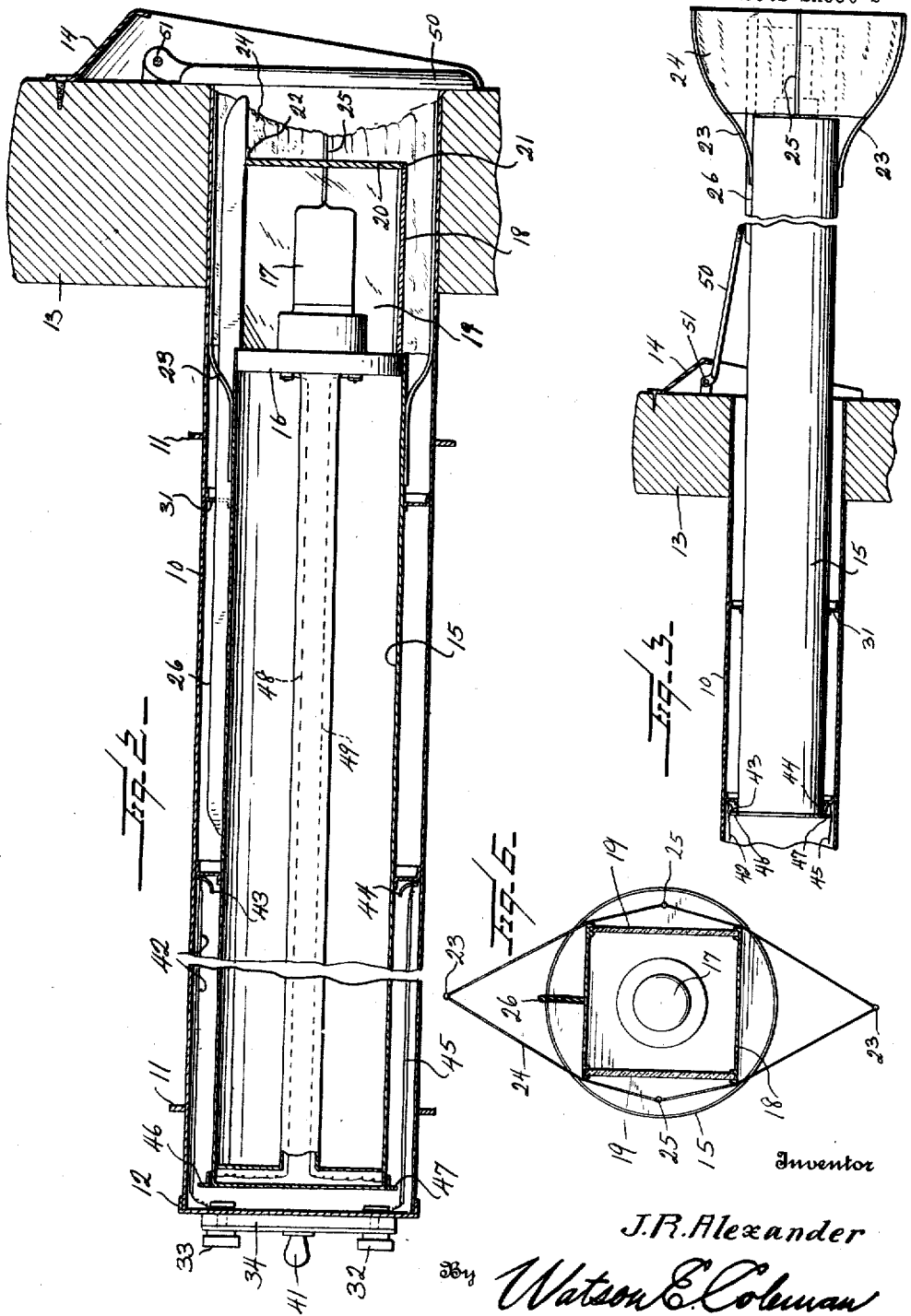

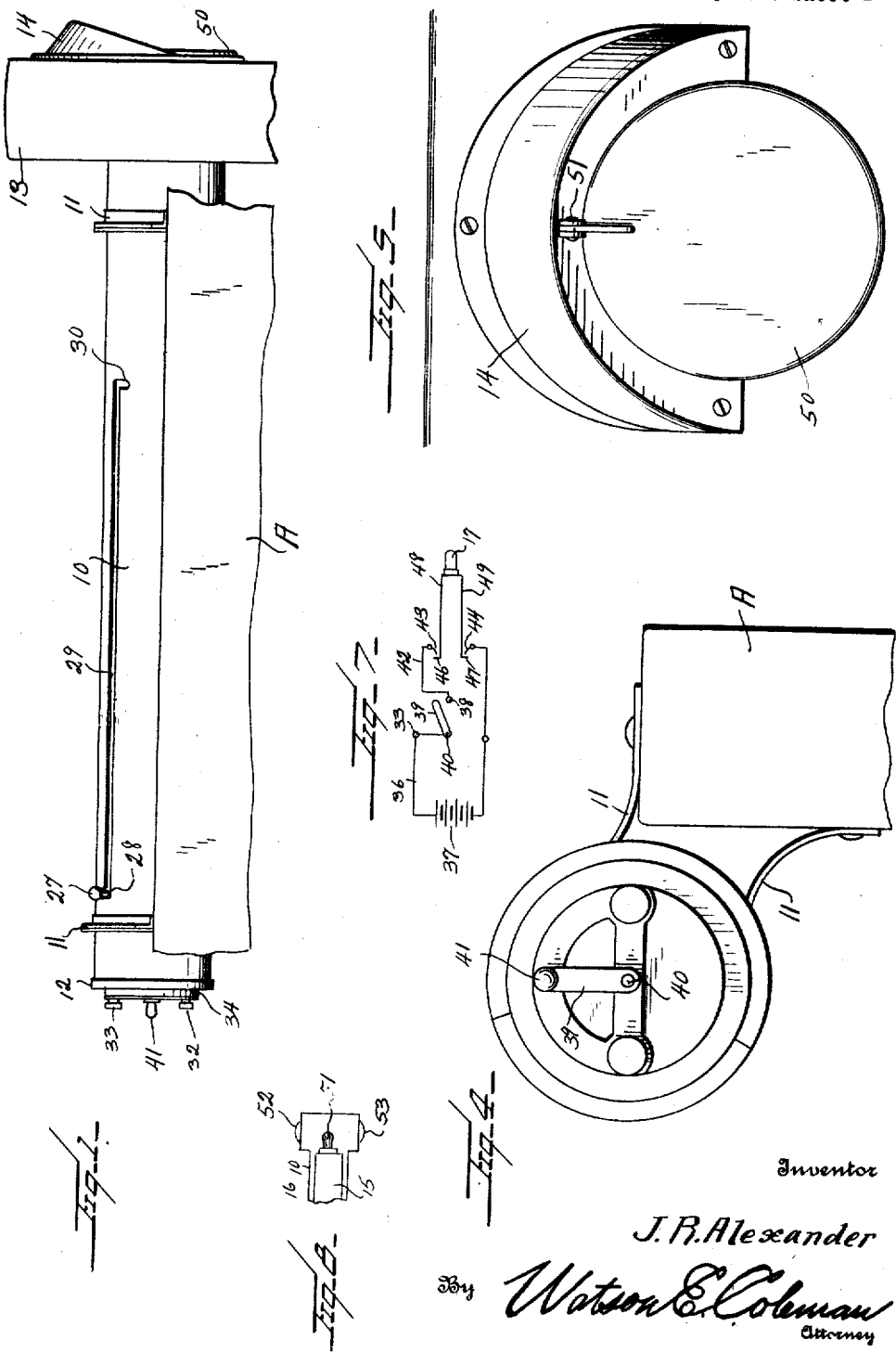

Patented May 1, 1923.

1,453,428

UNITED STATES PATENT OFFICE.

JOHN R. ALEXANDER, OF NEW ALBANY, INDIANA, ASSIGNOR OF ONE-HALF TO THOMAS ALEXANDER, OF TOLEDO, OHIO.

VEHICLE SIGNAL.

Application filed October 3, 1921. Serial No. 504,978.

*To all whom it may concern:*

Be it known that I, JOHN R. ALEXANDER, a citizen of the United States, residing at New Albany, in the county of Floyd and State of Indiana, have invented certain new and useful Improvements in Vehicle Signals, of which the following is a specification, reference being had to the accompanying drawings.

This invention relates to signalling devices, particularly to those adapted for use on vehicles, and has for its object the provision of a signal device designed to be mounted upon some convenient location on an automobile and operable to apprise the drivers of approaching and following vehicles of an intended change in the direction of travel or a contemplated stop, the signal including a movable member which when in projected position will indicate to the drivers of other vehicles as well as pedestrians that they should proceed with caution.

An important object is the provision of a device of this character which includes illuminating means whereby it may be used equally well by night as by day, the illuminating means furthermore being of such a nature and so arranged as to be energized automatically when the signal member is moved into its projected or signalling position.

Another object is the provision of a device of this character which is so constructed that it may also be used as a parking lamp. A still further object is the provision of a signal in which the projectable member carries an expansible hood of flexible translucent material of suitable color, this hood being automatically collapsed when the signal is in inoperative position.

Yet another object is the provision of a signal which is provided with an automatic door structure which opens and closes when the movable member is projected into and subsequently withdrawn from signalling position, the function of the door being to exclude water and dirt and protect the interior mechanism of the device.

An additional object is the provision of a device of this character which will be simple and inexpensive in manufacture, easy to install, simple to operate, positive in action, efficient and durable in service and a general improvement in the art.

With the above and other objects and advantages in view, the invention consists in the details of construction to be hereinafter more fully described and claimed, and illustrated in the accompanying drawings, in which:

Figure 1 is an elevation of my device mounted upon a vehicle;

Figure 2 is a longitudinal sectional view therethrough with the signal member in retracted position;

Figure 3 is a similar view showing the signal member in extended position;

Figure 4 is an elevation of one end;

Figure 5 is an elevation of the other end;

Figure 6 is an end elevation of the signal member alone;

Figure 7 is a diagrammatic view of the electric circuit;

Figure 8 is a detail view showing how the device might be used as a parking lamp.

Referring more particularly to the drawings, the letter A designates a portion of a motor vehicle upon which my device is mounted. In carrying out my invention I provide an elongated tube 10 preferably of sheet metal and properly finished to present a pleasing and ornamental appearance. This tubular member 10 may be mounted upon the vehicle in any one of a wide variety of ways, though I have illustrated brackets 11 which are secured to some convenient portion of the vehicle, preferably along the dash so that the device will be in front of the driver and within convenient reach. One end of this tube 10 is closed by a cap 12 and the other end extends within a casing 13 which has its outer face formed with an overhanging cowl 14.

Slidable within the tube 10 is a smaller tube 15 which has one end carrying a socket 16 within which is engaged an incandescent bulb 17. Carried by this end of the tube 15 is a frame 18 which has its front and back covered with glass panes 19, one of which is red and the other of which is green and the outer end 20 of this frame is hingedly mounted, as shown at 21, and provided with a suitable catch 22. The purpose of having this outer end of the frame thus mounted is to permit replacement of the bulb in case it burns out. Secured upon this end of the tube 15 are normally divergent arms 23 to which are secured sheets of flexible fabric 24, preferably silk, and these sheets are also of different colors corresponding to the colors of the panes 19. I also provide wires or rods 25 to which these fabric sheets are secured so that normally their position will be such that when viewed from the end they will define a diamond shaped hood which of course is capable of collapsing, as will be hereinafter explained. At its upper portion the tube 15 also carries a longitudinally extending rib 26 for a purpose to be described.

In order that the inner tube 15 may be moved longitudinally of the outer tube 10, I provide an operating knob 27 which has a shank 28 connected with the inner tube and movable along a longitudinal slot 29 in the outer tube, the ends of the slot being formed with lateral extensions 30 within which the shank 28 may be engaged for holding the inner tube 15 at either limit of its movement. Secured within the outer shell 10 are guide rings 31 which serve as bearings for the inner tube 15 when the latter is slid longitudinally by the knob device above described.

In order to provide for energization of the lamp 17, I provide two binding screws 32 and 33 which are secured upon a disk 34 of insulating material carried by the cap 12 and these binding screws are adapted for connection with wires 35 and 36 leading from a suitable source of current 37 which may be the storage battery of the car or which might be dry cells or the like. This disk 34 carries a stationary contact 38 with which cooperates a movable contact 39 pivoted at 40 and having an operating knob 41. This movable arm is connected with the binding screw 33. Connected with the stationary contact 38 is a wire 42 which is connected with a contact 43 secured upon and insulated from one of the guide rings 31. Located upon this same guide ring at a diametrically opposite point and insulated therefrom is a second contact 44 which is connected by a wire 45 with the binding screw 32. Secured upon the inner end of the inner tube 15 are contacts 46 and 47 carried by an outstanding flange and connected with these contacts are wires 48 and 49 respectively which extend longitudinally of the tube and which are connected with the terminal of the socket 16.

In order that the inner tube and associated parts will be protected from the weather, I provide a disk like plate 50 which is hinged at 51 upon the outer face of the casing 13 and which normally extends straight down covering the opening through which the tube 15 and associated parts may be projected.

Assuming that my device has been constructed and mounted as above described, the operation is as follows: Ordinarily when the device is not in use the tube 15 is held retracted within the tube 10 with the knob 27 engaged within the lateral extension 30 at the inner end of the slot 29. The frame surrounding the incandescent bulb and the flexible hood will then of course be disposed entirely within the outer tube 10 and the plate 50 will be in depending position closing the opening in the casing 13. When the operator contemplates turning in either direction or making a stop, he grasps the knob 27, pulls it forward slightly and then slides it along the slot 29 until it engages within the other slot extension 30. As this is done the inner tube 15 is projected through the casing 13 into the position shown in Figure 3, the rib 26 riding under the plate 50 and lifting the plate out of the way. As the movable member leaves the casing 13 it is apparent that the inherent resilience of the spring arms 23 will cause them to spring outwardly drawing the fabric sheets 24 taut and thus defining a flattened hood which is well calculated to attract the attention of the drivers of following and approaching traffic and also pedestrians. When the signal is thus operated it will of course warn others that they should proceed with caution and watch for further movements of the vehicle equipped with the signal. When the contemplated change in direction has been made the operator of course retracts the movable member within the tube 10 whereupon the hood will be collapsed and the plate 50 will return by gravity to its original position.

When the device is to be used at night the switch arm 39 is moved into its circuit closing position whereupon when the inner member 15 is projected to signalling position the engagement of the contacts 46 and 47 with the contacts 43 and 44 respectively will cause illumination of the bulb 17 as the current passing from the source through the binding screws 32 and 33 will be conducted through the wires 42 and 45 to and through the contacts 43 and 44 and contacts 46 and 47 through the wires 48 and 49 and the filament of the bulb. When the signal is retracted and the contacts 46 and 47 disengage the contacts 43 and 44 the lamp 17 will be deenergized.

In order that the device may be used as a parking lamp, I may provide a separate incandescent bulb within the upper portion of the casing 13 and of course connected with the source of current in the usual manner and having some suitable switch associated therewith. In this event the front of the casing, that is the side toward the front of the vehicle would have to be provided with an opening covered by plain glass while the side toward the rear would be provided with an opening covered with red glass. This structure is illustrated in one of the detail views in which the numeral 51 designates the bulb and the numerals 52 and 53 designate respectively the white and red glass.

From the foregoing description and a study of the drawings it will be apparent that I have thus provided a simply constructed and easily installed signalling device for use on automobiles, trucks and in fact any vehicle whereby to warn drivers of other vehicles, pedestrians and traffic officers of a contemplated change in direction so that proper care may be exercised by all parties concerned to avoid collision and traffic congestion. Owing to the simplicity of the construction it is to be observed that there is very little likelihood of derangement and the device should consequently have a long life and be satisfactory in every way.

While I have shown and described the preferred embodiment of the invention it is of course to be readily understood that I reserve the right to make such changes in the form, construction and arrangement of parts as will not depart from the spirit of the invention or the scope of the subjoined claims.

Having thus described my invention, I claim:

1. A signalling device for vehicles comprising an elongated tubular member, an inner member slidable within said tubular member, a collapsible hood structure carried by the inner member and including a pair of normally divergent spring arms, a pair of stationary arms between the spring arms and sheets of fabric connected with said spring arms and stretched over said stationary arms, an illuminating element mounted at the outer end of said inner member and disposed within said hood, a frame surrounding and protecting the bulb, and transparent panes of different colors mounted at the front and back of the frame.

2. A signalling device for vehicles comprising a tubular support adapted to be rotatably mounted, a casing carried by the outer end of the support and having an opening registering with the bore of the support, an overhanging cowl carried by the outer face of the casing, a plate pivoted below said cowl and normally closing the opening in the casing, said support being formed with a longitudinal slot provided at its ends with lateral extensions, a movable member slidable within said tubular support and having an operating knob extending through said slot, a signal element carried by the outer end of said movable member, and a rib on said movable member engageable with said plate whereby to lift the same when the movable member is slid into projected position.

3. A signalling device for vehicles comprising a tubular support adapted to be rotatably mounted, a casing carried by the outer end of the support and having an opening registering with the bore of the support, an overhanging cowl carried by the outer face of the casing, a plate pivoted below said cowl and normally closing the opening in the casing, said support being formed with a longitudinal slot provided at its ends with lateral extensions, a movable member slidable within said tubular support and having an operating knob extending through said slot, a signal element carried by the outer end of said movable member, and a rib on said movable member engageable with said plate whereby to lift the same when the movable member is slid into projected position, said signal element comprising a collapsible hood of flexible material automatically expanding when said movable member is slid into projected position, the rib constituting a protector for the hood.

In testimony whereof I hereunto affix my signature.

JOHN R. ALEXANDER.